US010380456B2

(12) United States Patent
Hosoi

(10) Patent No.: US 10,380,456 B2
(45) Date of Patent: Aug. 13, 2019

(54) CLASSIFICATION DICTIONARY LEARNING SYSTEM, CLASSIFICATION DICTIONARY LEARNING METHOD AND RECORDING MEDIUM

(71) Applicant: NEC Corporation, Minato-ku, Tokyo (JP)

(72) Inventor: Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 15/128,545

(22) PCT Filed: Mar. 20, 2015

(86) PCT No.: PCT/JP2015/001594
§ 371 (c)(1),
(2) Date: Sep. 23, 2016

(87) PCT Pub. No.: WO2015/146113
PCT Pub. Date: Oct. 1, 2015

(65) Prior Publication Data
US 2017/0039451 A1 Feb. 9, 2017

(30) Foreign Application Priority Data
Mar. 28, 2014 (JP) ................................. 2014-067597

(51) Int. Cl.
*G06K 9/00* (2006.01)
*G06K 9/62* (2006.01)
*G06N 20/00* (2019.01)

(52) U.S. Cl.
CPC ........... *G06K 9/6255* (2013.01); *G06K 9/628* (2013.01); *G06K 9/6257* (2013.01); *G06N 20/00* (2019.01)

(58) Field of Classification Search
None
See application file for complete search history.

(56) References Cited

U.S. PATENT DOCUMENTS

| 8,892,494 | B2 | 11/2014 | Ono et al. |
| 2005/0209785 | A1 | 9/2005 | Wells et al. |
| 2008/0219565 | A1 | 9/2008 | Hattori |
| 2008/0240579 | A1 | 10/2008 | Enomoto |
| 2011/0235901 | A1 | 9/2011 | Hu |

(Continued)

FOREIGN PATENT DOCUMENTS

| JP | 2008-217589 A | 9/2008 |
| JP | 2008-250908 a | 10/2008 |

(Continued)

OTHER PUBLICATIONS

P. Viola and M. Jones, "Robust real-time face detection", IJCV, 57(2): pp. 137-154, 2004.

(Continued)

*Primary Examiner* — Atiba O Fitzpatrick

(57) ABSTRACT

To provide a classification dictionary learning system and the like that can generate a classification dictionary capable of detecting, with a high classification rate, a particular object of which change in the appearance is large in an image. The classification dictionary learning system includes: setting unit sets the priority degree of the classification between the first class and the second class including the sub-class to a value designated by the user and the like; the classifier learning unit sets the priority degree; the selection unit learns multiple classifiers on the basis of the priority degree for each combination of sub-classes; the weight updating unit updates the weight on the basis of the classification accuracy based on the classifier learned with the selected combination.

18 Claims, 10 Drawing Sheets

(56) References Cited

U.S. PATENT DOCUMENTS

2012/0117010 A1  5/2012  Ono et al.
2013/0165336 A1  6/2013  Liew et al.

FOREIGN PATENT DOCUMENTS

| JP | 2011-027498 A | 2/2011 |
| JP | 2011-198181 A | 10/2011 |
| JP | 2013-033331 A | 2/2013 |
| WO | 2013/165336 A1 | 11/2013 |

OTHER PUBLICATIONS

R. Schapire, Y. Singer, "Improved boosting algorithms using confidence-rated predictions", Proc. of 11th conference on Computational Learning Theory, 1998.
J. Friedman, T. Hastie, R. Tibshirani, "Additive logistic regression: a statistical view of boosting", Annals of statistics, 28(2): pp. 337-374, 2000.
A. Torralba, K. P. Murphy, W. T. Freeman, "Sharing visual features for multiclass and multiview object detection", PAMI 2006.
Asako Kanezaki et al., "Simultaneous training of multi-class object detectors via large scale image dataset Introduction of target specific negative classes", Transactions of Information Processing Society of Japan, Computer Vision and Image Media (CVIM), Oct. 15, 2012, vol. 2012-CVIM-183, No. 12, pp. 1-8.
International Search Report for PCT Application No. PCT/JP2015/001594, dated Apr. 14, 2015.
English translation of Written opinion for PCT Application No. PCT/JP2015/001594.
Japanese Office Action for JP Application No. 2016-510017 dated Feb. 5, 2019 with English Translation.

Fig. 3

| SAMPLE CONSECUTIVE NUMBER | 1 | 2 | 3 | 4 | 5 | 6 | 7 | 8 |
|---|---|---|---|---|---|---|---|---|
| CLASS TO WHICH SAMPLE BELONGS | Pos1 | Pos1 | Pos2 | Pos2 | Pos3 | Pos3 | Neg | Neg |
| Pos1 | 0.01 | 0.01 | 0.01 | 0.01 | 0.01 | 0.01 | 0.02 | 0.02 |
| Pos2 | 0.01 | 0.01 | 0.01 | 0.01 | 0.01 | 0.01 | 0.02 | 0.02 |
| Pos3 | 0.01 | 0.01 | 0.01 | 0.01 | 0.01 | 0.01 | 0.02 | 0.02 |

Fig. 4

| SAMPLE CONSECUTIVE NUMBER | 1 | 2 | 3 | 4 | 5 | 6 | 7 | 8 |
|---|---|---|---|---|---|---|---|---|
| CLASS TO WHICH SAMPLE BELONGS | Pos1 | Pos1 | Pos2 | Pos2 | Pos3 | Pos3 | Neg | Neg |
| Pos1 | +1 | +1 | −1 | −1 | −1 | −1 | −1 | −1 |
| Pos2 | −1 | −1 | +1 | +1 | −1 | −1 | −1 | −1 |
| Pos3 | −1 | −1 | −1 | −1 | +1 | +1 | −1 | −1 |

Fig. 5

| SAMPLE CONSECUTIVE NUMBER | 1 | 2 | 3 | 4 | 5 | 6 | 7 | 8 |
|---|---|---|---|---|---|---|---|---|
| CLASS TO WHICH SAMPLE BELONGS | Pos1 | Pos1 | Pos2 | Pos2 | Pos3 | Pos3 | Neg | Neg |
| Pos1 | $\frac{1}{2}$ | $\frac{1}{2}$ | $\frac{1}{8}$ | $\frac{1}{8}$ | $\frac{1}{8}$ | $\frac{1}{8}$ | $\frac{1}{4}$ | $\frac{1}{4}$ |
| Pos2 | $\frac{1}{8}$ | $\frac{1}{8}$ | $\frac{1}{2}$ | $\frac{1}{2}$ | $\frac{1}{8}$ | $\frac{1}{8}$ | $\frac{1}{4}$ | $\frac{1}{4}$ |
| Pos3 | $\frac{1}{8}$ | $\frac{1}{8}$ | $\frac{1}{8}$ | $\frac{1}{8}$ | $\frac{1}{2}$ | $\frac{1}{2}$ | $\frac{1}{4}$ | $\frac{1}{4}$ |

CLASSIFICATION DICTIONARY LEARNING SYSTEM, CLASSIFICATION DICTIONARY LEARNING METHOD AND RECORDING MEDIUM

This application is a National Stage Entry of PCT/JP2015/001594 filed on, Mar. 20, 2015, which claims priority from Japanese Patent Application 2014-067597 filed on Mar. 28, 2014, the contents of all of which are incorporated herein by reference, in their entirety.

TECHNICAL FIELD

The present invention relates to a classification dictionary learning system and the like for performing learning in order to detect an object from an image.

BACKGROUND ART

A template matching search method has been used since long ago. In the template matching search method, in a case where an object of a particular type shown (recorded) in an image is detected, and the position of the object is to be determined, a template image showing only the object is prepared. Then, a search window is set in the image in question which is considered to include a partial image representing the object, and a matching calculation with the template image is repeated. In this method, a low level of accuracy is obtained from the matching simply using a pixel value of the template image and a pixel value in the image in question. Therefore, in order to enhance the matching accuracy, a method has been developed. In this method, gradient information with surrounding pixels, secondary differential information, and the like are calculated in the template image and the image in question, and they are converted into a numerical value string called a feature quantity that can be easily used for matching. Further, a method has been developed to perform matching calculation by using a classification dictionary learned by using a statistical pattern classification technique. This classification dictionary is a dictionary for performing two class classification, i.e., a positive class which is an object class and a negative class which is a non-object class. More specifically, it is a memory storing a parameter group required for classification.

A statistical pattern classification technique often used for object detection includes a learning method called Boosting. In the Boosting, relatively simple identifiers called weak classifiers are combined to generate an identifier having a high level of classification accuracy called a strong classifier. Non-patent literature 1 discloses a method in which the Boosting is effectively used for object detection. In this method, the weak classifier employs Decision-Stump processing. In this processing, a Rectangle Filter is used to simply perform threshold value processing on a single Haar wavelet-like feature quantity on which high speed extraction processing can be performed. Boosting called AdaBoost is employed for generation of a strong classifier.

Non-patent literature 2 discloses a Boosting method called Real AdaBoost obtained by improving AdaBoost. In this method, instead of simple Decision-Stump processing, weak classification is performed on the basis of an occurrence probability of a numerical value representing a feature quantity of a positive class and an occurrence probability of a numerical value representing a feature quantity of a negative class. Therefore, as long as there is a large amount of learning data, highly accurate object detection can be realized.

Non-patent literature 3 discloses a Boosting method called Gentle AdaBoost. In this method, a definition of an index (loss) optimized in the Boosting is made into positive, and therefore, the learning is stabilized. Accordingly, the same level of accuracy as Real AdaBoost or a level of accuracy higher than that can be obtained. When a method obtained by combining non-patent literature 1, non-patent literature 2, and non-patent literature 3 is used, a particular object such as a face and a vehicle can be detected with a high degree of accuracy from an image. However, only an object of which change in the appearance of the object is not large can be obtained. For example, only a front face and the like can be detected.

In order to detect an object of which change in the appearance is large from the image in question, the following method is often used. In the method, a classification dictionary is prepared for each type of change in appearance, and detection processing is performed as many as the number of dictionaries. However, this method requires detection processing to be performed as many as the number of classification dictionaries, and therefore, there is a problem in that the processing time increases. To solve this problem, non-patent literature 4 discloses a method for classifying a change in the appearance and recognizing them as separate categories, and performing learning so that a feature quantity and a weak classifier can be shared between multiple classes. In this method, the weak classifier can be shared, and therefore, the processing time would not simply increase a number of times as many as the number of classes. Therefore, according to this method, relatively fast processing can be realized. Classes for object detection as described above has a hierarchical multi-class configuration in which positive classes are multiple sub-classes and the negative is a single class. In the hierarchical multi-class configuration, it is necessary to identify positive classes from each other under the condition that an classification between the entire positive classes and the negative class is treated with the highest degree of importance. In non-patent literature 4, learning is performed so as to be able to classify each positive class and the negative class, output the score of each positive class, and classify the hierarchical class as a result.

CITATION LIST

Non Patent Literature

[Non-patent literature 1] P. Viola and M. Jones, "Robust real-time object detection", IJCV, 57(2): pages 137-154, 2004

[Non-patent literature 2] R. Schapire, Y. Singer, "Improved boosting algorithms using confidence-rated predictions", Proc. of 11th conference on Computational Learning Theory, 1998

[Non-patent literature 3] J. Friedman, T. Hastie, R. Tibshirani, "Additive logistic regression: a statistical view of boosting", Annals of statistics, 28(2): pages 337-374, 2000

[Non-patent literature 4] A. Torralba, K. P. Murphy, W. T. Freeman, "Sharing visual features for multiclass and multiview object detection", PAMI 2006

SUMMARY OF INVENTION

Technical Problem

However, as described above, in a method combining non-patent literature 1, non-patent literature 2, and non-patent literature 3, there is a problem in that only an object of which change in the appearance is not large, for example, only a front face and the like, can be detected.

In the method of non-patent literature 4, there is a problem in that a high classification rate cannot be obtained for a classification dictionary for detecting a particular object of which variation in its appearance is large on an image. This is because it is impossible to set the degree of priority with which a classification accuracy between a positive class and a negative class and a classification accuracy between positive classes are learned. When only a weak classifier of which degree of priority of classification accuracy is fixed can be learned, a dictionary optimum for classification cannot be configured for a strong classifier obtained from a combination thereof. In an object detection, detecting an object is treated with the highest degree of priority, and therefore, the classification accuracy between the positive class and the negative class is especially important.

The present invention has been made in view of the above problems. It is a main object of the present invention to provide a classification dictionary learning system and the like that can generate a classification dictionary capable of detecting, with a high classification rate, a particular object of which change in the appearance is large in an image.

Solution to Problem

In the view of the above problems, first aspect of the present invention is a classification dictionary learning system. The system includes: a setting unit that receives a priority degree of a classification including a first class and a second class including a sub-class, and sets the priority degree; an identifier learning unit that learns a plurality of identifiers on the basis of the priority degree for each combination of the sub-classes; a selection unit that selects a combination of the sub-classes in which a predetermined optimization index is the most preferable with regard to the identifier; and a weight update unit that updates a weight on the basis of an classification accuracy based on the identifier learned with the selected combination.

Second aspect of the present invention is a classification dictionary learning method used for a classification dictionary learning system for generating a classification dictionary. The method includes: receiving a priority degree of a classification including a first class and a second class including a sub-class, and setting the priority degree; learning a plurality of identifiers on the basis of the priority degree for each combination of the sub-classes; selecting a combination of the sub-classes in which a predetermined optimization index is the most preferable with regard to the identifier; and updating a weight on the basis of an classification accuracy based on the identifier learned with the selected combination.

Third aspect of the present invention is a classification dictionary learning program. The program is used for a classification dictionary learning system for generating a classification dictionary, wherein the classification dictionary learning program causes a computer to achieve each of functions provided in the system, and the functions include: a function of receiving a priority degree of a classification including a first class and a second class including a sub-class, and setting the priority degree; a function of learning a plurality of identifiers on the basis of the priority degree for each combination of the sub-classes; a function of selecting a combination of the sub-classes in which a predetermined optimization index is the most preferable with regard to the identifier; and a function of updating a weight on the basis of an classification accuracy based on the identifier learned with the selected combination.

Advantageous Effects of Invention

According to the present invention, a classification dictionary capable of detecting, with a high classification rate, a particular object of which change in the appearance is large in an image can be generated.

BRIEF DESCRIPTIONS OF DRAWINGS

FIG. 3 is a figure illustrating a data configuration of a weight table of a weight storage unit.

FIG. 4 is a figure illustrating a data configuration of a label table.

FIG. 5 is a figure illustrating a data configuration of a weight table of a weight storage unit.

DESCRIPTION OF EMBODIMENTS

Figure 1:
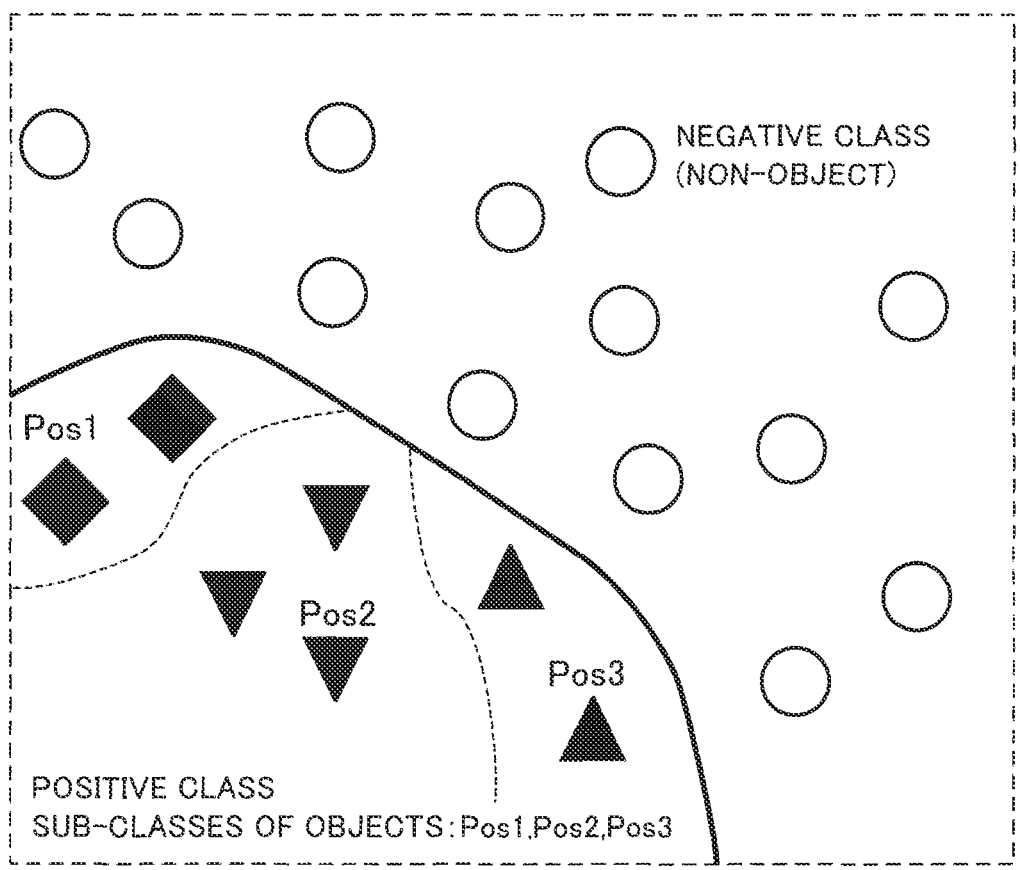
FIG. 1 is a conceptual diagram schematically illustrating a concept of each class.

Subsequently, exemplary embodiments of the present invention will be explained with reference to drawings. In the drawings described below, the same or similar portions are denoted with the same or similar reference numerals. However, it should be noted that the drawings are given to schematically illustrate the exemplary embodiment. Further, the exemplary embodiments described below are merely examples, and it should be noted that the exemplary embodiments can be changed as necessary within a scope in which the gist thereof stays the same.

First Exemplary Embodiment

An classification dictionary learning system according to the first exemplary embodiment of the present invention uses a hierarchical multi-class configuration as illustrated in FIG. 1 in a classification of image data obtained by shooting (recording) a particular object used for learning of image detection, e.g., a face (hereinafter referred to as "learning sample"). Points such as ○, ▲, ▼, ◆, and the like in FIG. 1 mean learning samples (hereinafter simply also referred to as "sample"), and FIG. 1 is a conceptual diagram obtained by plotting this as a feature plane representing two classes. A sample is classified into a positive class and a negative class which are the two classes. A positive class is constituted by multiple sub-classes (for example, a Pos1 class (abbreviation of "positive", the same applies to the following cases) representing a front face class indicated by ♦ mark, a Pos2 class representing a side face class indicated by ▼ mark, and a Pos3 class representing a diagonal face class indicated by ▲ mark). Hereinafter, they will be described as a positive class. A negative class indicated by ○ mark is a class of image data not showing any particular object (face), and is only one class. A border between the positive class and the negative class in FIG. 1 schematically indicates a border between an object and a non-object.

Subsequently, for the sake of convenience of the following explanation, a framework of multi-class classification processing using a classification dictionary generated according to the present exemplary embodiment will be explained first. The classification dictionary stores information about many weak classifiers learned, and when the weak classifiers are executed one by one in order, an overall classification result can be obtained.

The processing combining weak classifiers is referred to as a strong classifier in a pattern recognition field of mechanical learning, and this framework is a variation of a method (technique) called Boosting. Each of the weak classifiers corresponds to one or multiple positive classes, and the weak classification processing outputs two types, i.e., a score of a corresponding positive class and a score of a non-corresponding positive class.

More specifically, with regard to a positive class corresponding to the weak classifier, a score calculated by a single weak classifier is an identical value. With regard to the remaining positive classes, a score calculated by a single weak classifier is another identical value. The classification dictionary learning system according to the present exemplary embodiment processes multiple weak classifiers, calculates a cumulative sum of scores for each positive class, and adopts the calculated cumulative sum as an output of the strong classifier (strong classification score). More specifically, the strong classification score is derived for each positive class, and therefore, classification can be made into a positive class yielding the maximum value thereof.

Hereinafter, in order to simply express a positive class corresponding to each weak classifier, a set made up with a single positive class or a combination of multiple positive classes will be simply denotes as a combination $S_n$ (the number of combinations: n=1, . . . , the number of combination candidates).

The calculation of the strong classification score is expressed by expression 1. $H^c$ denotes an output value of a strong classifier expressing a likelihood of positive class c, $N_m$ denotes the number of weak classifiers, and m denotes a weak classifier number. Both of the strong classifier and the weak classifier outputs as many scores ($H^c$ or $h^c$) for each positive class c as the number of all the positive classes (c=1, . . . , $N_c$). More specifically, the strong classifier and the weak classifier output numerical value as many as the number of positive classes.

$$H^c = \sum_{m=1}^{N_m} h_m^c \quad (1)$$

When the classification processing is performed by using such strong classifier, it is not necessary to calculate all the weak classifiers. When an intermediate output value obtained by calculating only some of the weak classifiers (m=1, . . . , $N'_m$: however $N'_m < N_m$) are retrieved, and this intermediate output value is processed in threshold value processing, the remaining calculation can be omitted. In particular, in a case where an object detection is performed, the chance that the input to the identifier is a negative class (background class) is extremely high. For this reason, when the input can be determined to be a negative class with a small number of weak classifiers, the calculation cost becomes very small, and therefore, an object can be detected at a high speed.

(Identification Dictionary Learning System)

Figure 2:
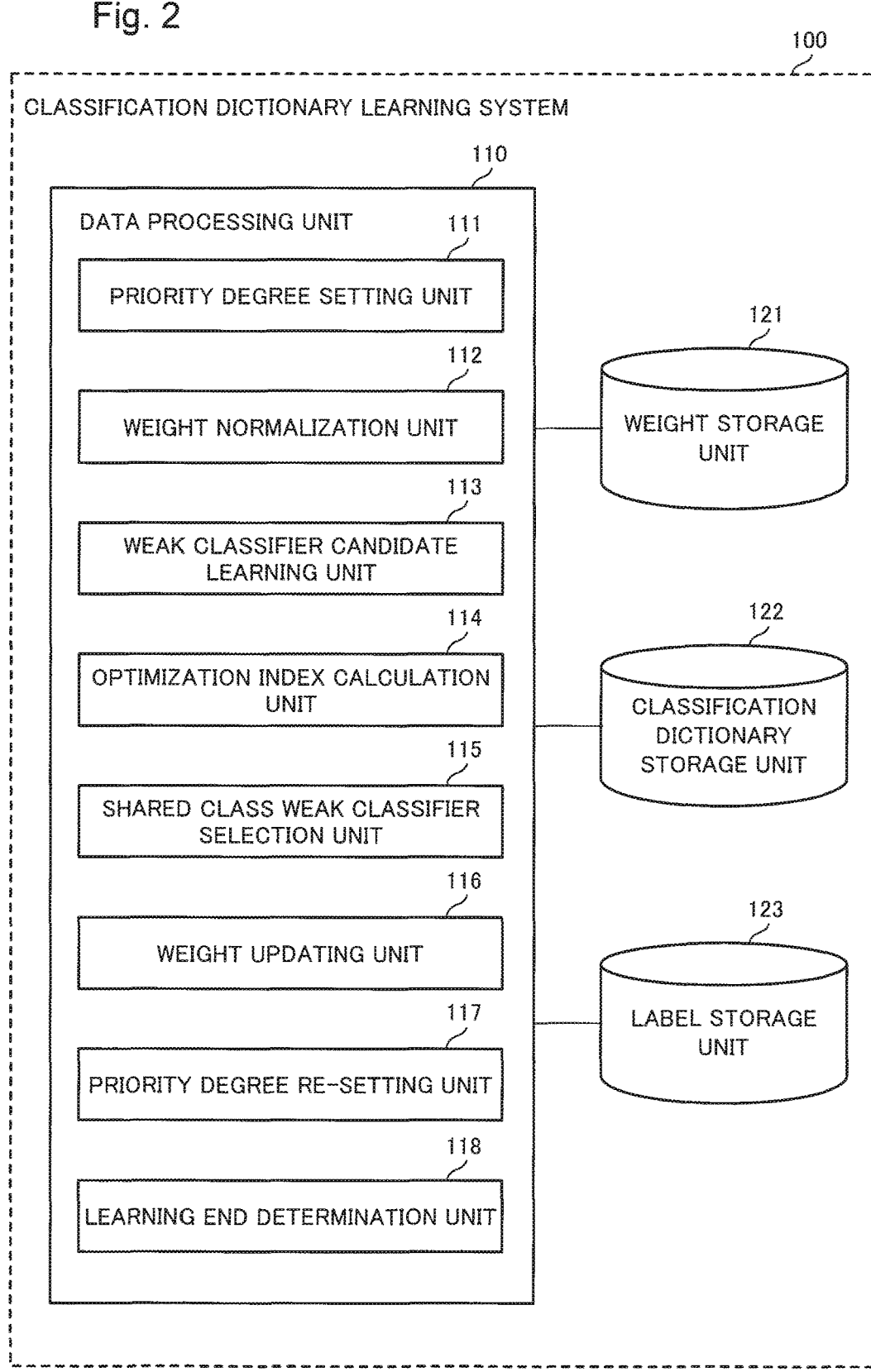
FIG. 2 is a figure illustrating an internal configuration of a classification dictionary learning system according to a first exemplary embodiment of the present invention.

An classification dictionary learning system 100 according to a first exemplary embodiment of the present invention includes a data processing unit 110, a weight storage unit 121, a classification dictionary storage unit 122, and a label storage unit 123 as illustrated in FIG. 2. The data processing unit 110 includes a priority degree setting unit 111, a weight normalization unit 112, a weak classifier candidate learning unit 113, an optimization index calculation unit 114, a shared class weak classifier selection unit 115, a weight updating unit 116, and a priority degree re-setting unit 117.

Figure 10:
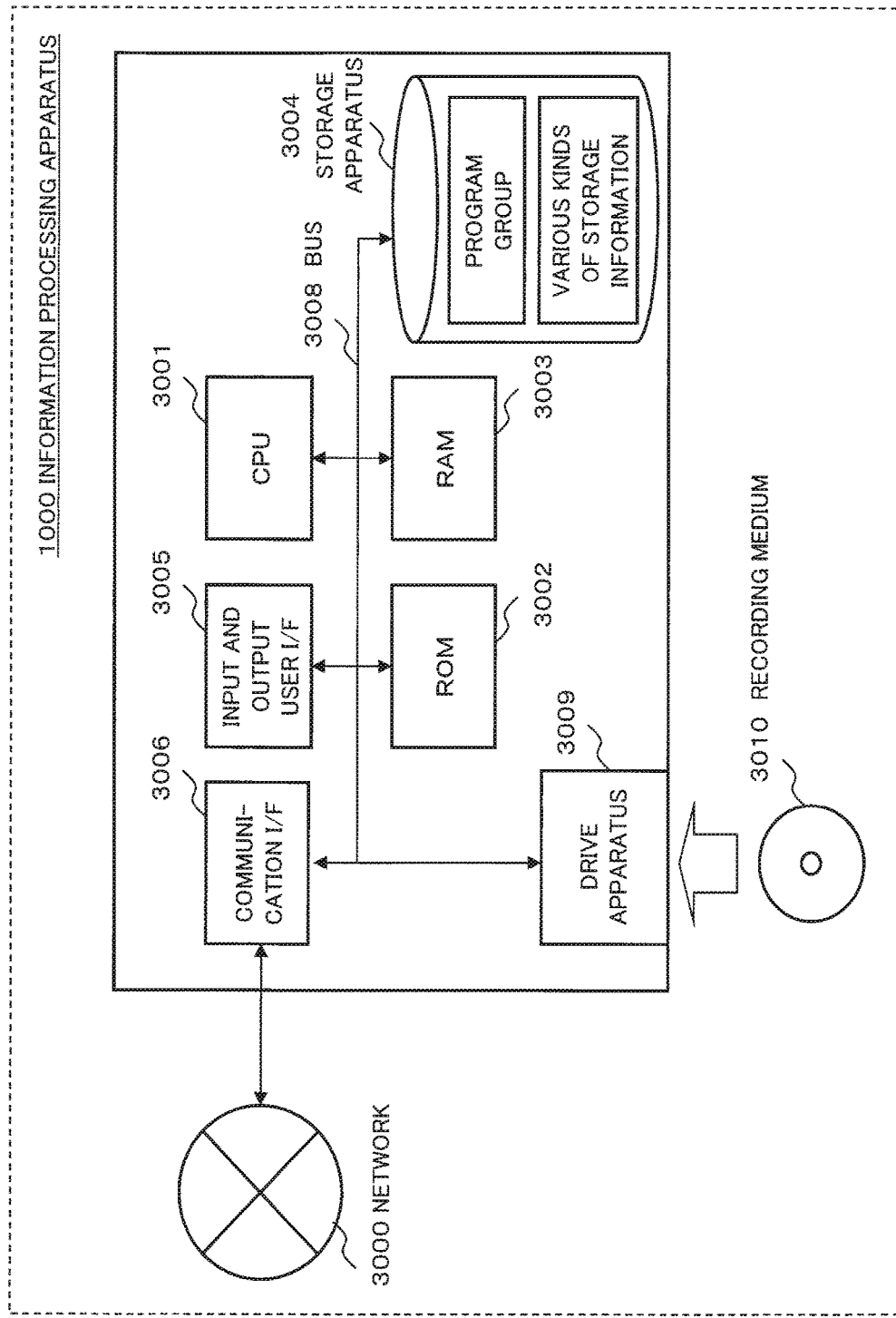
FIG. 10 is a configuration diagram illustrating an information processing apparatus for realizing an exemplary embodiment according to the present invention.

Each unit represents a functional block, and each unit is processed as necessary in calculation processing by a CPU (Central Processing Unit) 3001 as illustrated in FIG. 10. The details thereabout will be explained later.

The weight storage unit 121 stores a weight table in which a weight coefficient of each learning sample is described for each positive class. The weight table is information (data) in which each weight value is assigned to a table in which consecutive numbers of all the learning samples and positive classes are associated with each other.

The classification dictionary storage unit 122 stores a parameter of the strong classifier derived on the basis of learning processing. The strong classifier is constituted by a set of weak classifiers, and therefore the stored information is substantially equivalent to the parameter of multiple weak classifiers derived on the basis of the learning processing. The parameter provided for each weak classifier is "information for identifying a selected feature quantity", "a reference table for obtaining an output value of a weak classifier", and "information for a combination of positive classes corresponding to a weak classifier".

In the present exemplary embodiment, the feature quantity means any element that can be a feature quantity of a learning sample. It is, for example, a color, a pixel value, a gradient (a primary differential of a pixel value), a secondary differential of a pixel value, and the like. The information for identifying the feature quantity is information for identifying which feature quantity is selected as a feature quantity used for any given weak classifier. For example, in a case where a consecutive number and the like are given to the feature quantities, the information may be this consecutive number, or may be a parameter for extracting the feature quantity. The reference table is information (data) constituting a look up table for calculating an output value of a weak classifier on the basis of a value of a feature quantity of a learning sample. The details of the reference table will be explained later.

The positive class corresponding to the weak classifier is information for identifying which one of combinations $S_n$ of the positive classes the weak classifier corresponds to. In the weak classifier according to the present exemplary embodiment, the calculation expression is different according to whether it is a class included in $S_n$. Accordingly, it is necessary to determine based on which of them (i.e., the class in question or not) the calculation is to be performed. Therefore, this information is required. In order to hold a single $S_n$, for example, as many ON/OFF flags as the number of positive classes may be provided.

The classification dictionary storage unit 122 successively records parameters of weak classifiers obtained during operation of the classification dictionary learning system 100. When all the operation of the classification dictionary learning system 100 is completed, a classification dictionary recorded with all the parameters is completed in the classification dictionary storage unit 122.

The label storage unit 123 stores a label table in which a label which is a value of +1, −1, or the like used for learning is assigned for each positive class with regard to each learning sample.

The priority degree setting unit 111 reflects, as a priority degree of classification of a negative class and a positive class, a value desired by a user in a weight table. This is performed first in the learning processing. At this occasion, the priority degree of the negative class is preferably configured to be larger than the priority degree of the positive class. This is to perform learning while the classification of the negative class and the positive class is regarded as important at the learning stage of the weak classifier in the initial state.

For example, the user sets the rate of the priority degree of the negative class with respect to the positive class to two. According to this setting, the priority degree of the negative class according to any given learning sample is $D^{neg}=\{1/\text{the total number of learning data}\}\times 2$, and the priority degree of the positive class is $D^{pos}=\{1/\text{the total number of learning data}\}$. As a result, as illustrated in FIG. 3, the weight of the negative class is $D^{neg}=0.02$, and the weight of the positive class is $D^{pos}=0.01$. However, "×" denotes a multiplication, and "/" denotes a division.

The weight normalization unit 112 normalizes the value of the weight table of the learning sample. More specifically, the weight normalization unit 112 executes normalization so that the total number of sample weights to which the label z=+1 is given and the total number of weights of the samples to which label z=−1 is given become the same. The label is a value such as +1 or −1 used during learning, and as illustrated in FIG. 4, it is assigned to each positive class with regard to each learning sample. It should be noted that the table of FIG. 4 is stored in the label storage unit 123.

In the example as illustrated in FIG. 4, the label corresponding to the class to which each learning sample belongs is +1, and the other is −1. More specifically, during the normalization, {sample weight to which label z=+1 is given}/{the total number of all the sample weights to which label z=+1 is given} and {sample weight to which label z=−1 is given}/{the total number of all the sample weights to which label z=−1 is given} are calculated, and they may be replaced with the corresponding calculation results.

For example, when the weight table of FIG. 3 is normalized in a case where the label of each learning sample is assigned as illustrated in FIG. 4, FIG. 5 is obtained. For a case of a combination $S_n$ of any given positive class and any given feature quantity, the weak classifier candidate learning unit 113 learns (generates) a weak classifier, and adopts them as a candidate of a weak classifier. This processing is repeatedly executed on the combination $S_n$ of all the feature quantities and all the positive classes. However, for the implementation, the numerical quantity of the combination $S_n$ may be limited so that the repetition processing is finished in a practical processing time.

The learning of the weak classifier is as follows. In a case where a value of a feature quantity of any given learning sample is input, a parameter for calculating the output value of the weak classifier in that case is derived. The weak classifier may be any given module (processing, function) as long as a value is output for each positive class, but for example, hereinafter explained is a case where the following expression 2 is employed as the calculation expression with the weak classifier.

$$h_j^c = \begin{cases} \frac{1}{2}\ln\frac{\sum_{c \in S}\sum_i D_i^c \cdot \delta(z_i^c = +1) \cdot \delta(x_i \in X_j) + \varepsilon}{\sum_{c \in S}\sum_i D_i^c \cdot \delta(z_i^c = -1) \cdot \delta(x_i \in X_j) + \varepsilon}, & \text{if } c \in S_n \\ \frac{1}{2}\ln\frac{\sum_i D_i^c \cdot \delta(z_i^c = +1) + \varepsilon}{\sum_i D_i^c \cdot \delta(z_i^c = -1) + \varepsilon}, & \text{if } c \notin S_n \end{cases} \quad (2)$$

Characters and the like used in the expression 2 will be explained. $h_j^c$ denotes a weak classifier (an output value of weak classification). A function $\delta(\cdot)$ represents a function that yields one when a numerical expression given as an argument is true, and yields zero when the numerical expression given as the argument is false. In the expression 2, "*" denotes a multiplication. c denotes a subscript number ($N_c=N_1, \ldots, N_c$) representing a predetermined class of all the positive classes $N_c$. i denotes a subscript number of a learning sample. $Z_i^c$ denotes the label of the learning sample i which belongs to the class c. $x_i$ denotes the value of the feature quantity of the learning sample i. $D_i^c$ denotes the weight of the learning sample i which belongs to the class c. $X_j$ denotes a section (bin) of the value of the feature quantity. j denotes a subscript number indicating a predetermined bin in the section $N_j$ of the value of the feature quantity. $S_n$ denotes the class combination set explained above. ε denotes a small constant value. ln denotes a natural logarithm. The definitions of these symbols are also applicable to the expresses below.

The weak classifier candidate learning unit 113 is repeatedly executed, so that the values $h_j^c$ in the expression (1) for the sections (j=1, . . . , $N_j$) of all the feature value are calculated for a combination of all the feature quantities and all the positive classes. In a case where information associating "j, c" and $h_j^c$ is a candidate of the reference table and in the case of the expression 2, this is constituted by a table corresponding to the upper line of the expression (j numerical values) and a table corresponding to the lower line of the expression (c numerical values). It should be noted that the optimization index explained later is also calculated for all the feature quantities and all $S_n$. The shared class weak classifier selection unit 115 explained later selects a single feature quantity and a single $S_n$ yielding the minimum optimization index.

The weak classification during classification processing using the result of the present exemplary embodiment will be explained. For the score of the positive class included in the class set $S_n$, bin j is identified from the feature quantity of the sample to be identified, and, for example, the reference table of the second line of the expression 2 is used, so that a single value $h_j^c$ is calculated as a weak classification result of the sample.

On the other hand, for the score of the positive class not included in $S_n$, for example, the reference table in the second line of the expression 2 is used, so that a single value $h_j^c$ is calculated as a weak classification result of the sample. As described above, in the classification processing, the score of each positive class is derived as a result of a single weak classification. At this occasion, each score includes two types, i.e., the values in the first line and the values in the second line of the expression 2.

The calculation processing according to the expression 2 will be explained in details. First, in the case of the positive class included $S_n$, an occurrence rate of the numerical value of the feature quantity is counted with a sample weight, so that a histogram of which label is +1 and a histogram of which label is −1 are generated, and further, a logarithm of a ratio of bin values corresponding to these two histograms is calculated, so that the output value $h_j^c$ of the expression 2 of the sections (j=1, . . . , $N_j$) of all the feature quantities is calculated.

On the other hand, in the case of the positive class not included $S_n$, a weighted number of all the learning samples of which label is +1 and a weighted number of all the learning samples of which label is −1 are calculated, and further, the logarithm of the ratio thereof is calculated, so that the output value is calculated. This value is not dependent on a section of the feature quantity.

Figure 6A:
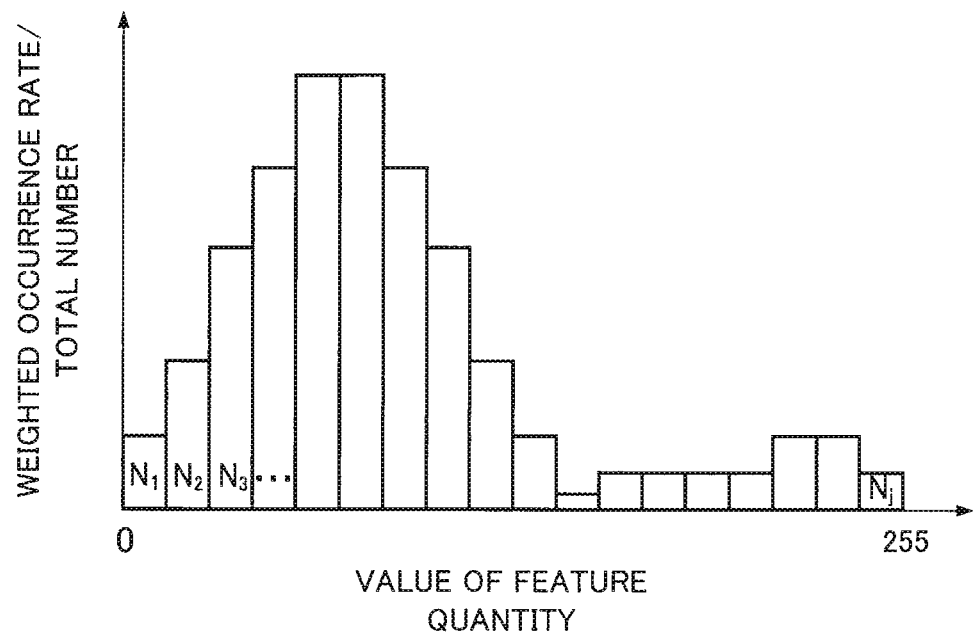
FIG. 6A is a figure illustrating a data configuration of a histogram table (label +1).
Figure 6B:
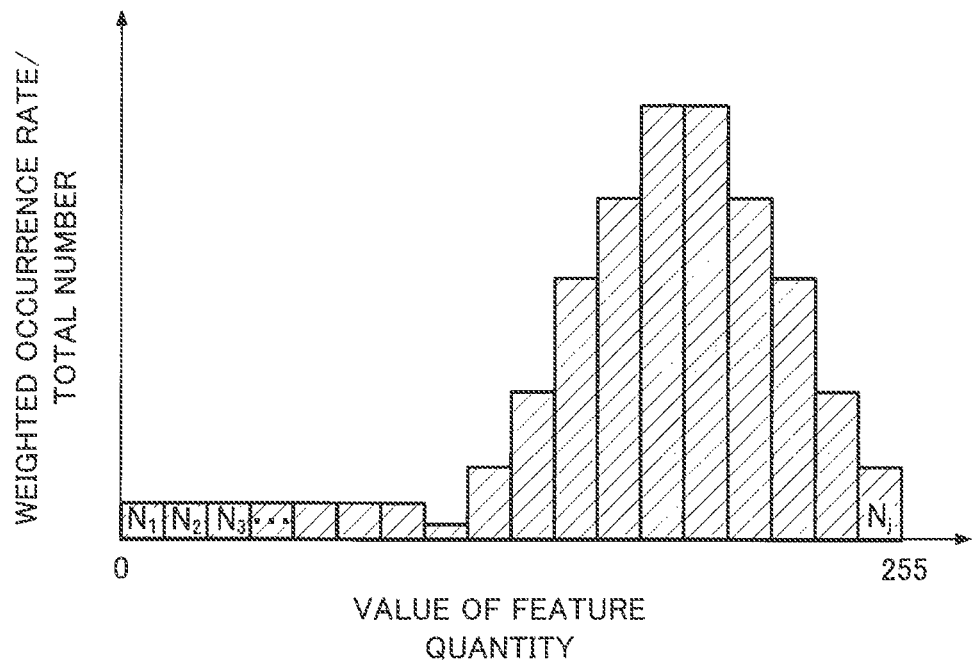
FIG. 6B is a figure illustrating a data configuration of a histogram table (label −1).

The above histogram will be explained for example as illustrated in FIG. 6A and FIG. 6B. FIG. 6A is a weighted histogram of which label is +1. FIG. 6B is a weighted histogram of which label is −1. A normal histogram is calculated y adding one per sample, but a weighted histogram is calculated by adding a weight value per sample. Therefore, the vertical axis of the histogram of FIG. 6A and FIG. 6B means a weighted occurrence rate, and the horizontal axis indicates the value of the feature quantity. For example, in a case where the feature quantity is an integer value from zero to 255, and the bin width of the histogram is, for example, 5, each bin $N_j$ is set to 0 to 4, 5 to 9, . . . , 245 to 249, 250 or more. The bin subscript numbers j are denotes as $N_1$, $N_2$, $N_3$, . . . , $N_j$ in the ascending order from the left.

In this case, in the histogram of FIG. 6A and FIG. 6B, the logarithm of the ratio of the values of the occurrence rates of bins to which the same subscript j is given is calculated, so that the output value $h_j$ is obtained. As the occurrence rate of the sample of which label is +1 is higher, and as the occurrence rate of the sample of which label is −1 is lower, the output value $h_j^c$ of the expression 2 attains a higher value. More specifically, in a case where the feature quantity of any given sample is included in the section j, and the value of $h_j^c$ is high, the chance that the sample is +1 is high.

In practice, when the change and the number of learning samples are in sufficient, the occurrence rate of the weighted labels may be zero in terms of numerical value. Therefore, it is preferable to reduce the risk of the value being zero by interpolating or smoothing them by using the values of bins in proximity.

On the other hand, the following expression 3 may be used instead of the expression 2 as an output expression of a weak classification. The expression 2 corresponds to calculation of the logarithm of the ratio of the possibilities, but the expression 3 corresponds to calculation of a difference of the possibilities. Like the expression 2, as the occurrence rate of the sample of which label is +1 is higher, and as the occurrence rate of the sample of which label is −1 is lower, the output value $h_j^c$ of the expression 3 attains a higher value. More specifically, in a case where the feature quantity of any given sample is included in the section j, and the value of $h_j^c$ is high, then, a higher value is calculated for a learning sample in which the sample is likely to be +1.

$$h_j^c = \begin{cases} \dfrac{\sum\limits_{c \in S}\sum\limits_{i} D_i^c \cdot \delta(z_i^c = +1) \cdot \delta(x_i \in X_j) - \sum\limits_{c \in S}\sum\limits_{i} D_i^c \cdot \delta(z_i^c = -1) \cdot \delta(x_i \in X_j)}{\sum\limits_{c \in S}\sum\limits_{i} D_i^c \cdot \delta(x_i \in X_j)}, & \text{if } c \in S_n \\ \dfrac{\sum\limits_{i} D_i^c \cdot \delta(z_i^c = +1) - \sum\limits_{i} D_i^c \cdot \delta(z_i^c = -1)}{\sum\limits_{i} D_i^c}, & \text{if } c \notin S_n \end{cases} \quad (3)$$

For the case where the set $S_n$ of any given positive class and any given feature quantity are used, the optimization index calculation unit 114 uses the output value based on the candidate of the weak classifier to calculate the index to be optimized on the basis of learning (hereinafter referred to as "optimization index value L"). This index corresponds to a value called loss, cross entropy loss, or likelihood in the pattern recognition field, and as the value of the index is smaller, the classification result is determined to be correct. In a case where the output value $h_j^c$ is obtained from the expression 2, the optimization index value L may be calculated from the following expression 4 or the expression 5. It should be noted that e denotes Napier's constant. The expression 5 is a calculation expression simplified in order to suppress the calculation cost, and $L_c$ is calculated for all the classes in the class combination set $S_n$, and the value obtained by calculating the summation thereof is adopted as the loss. Strictly speaking, the optimization index values L (losses) calculated from the above expression 4 and the expression 5 are different.

$$L = L_{c \in S_n} + L_{c \notin S_n} \quad (4)$$

$$L_{c \in S_n} = 2 \cdot \sum_j \sqrt{\dfrac{\sum\limits_{c \in S_n}\sum\limits_{i} D_i^c \cdot \delta(z_i^c = +1) \cdot \delta(x_i \in X_j) \cdot}{\sum\limits_{c \in S_n}\sum\limits_{i} D_i^c \cdot \delta(z_i^c = -1) \cdot \delta(x_i \in X_j)}}$$

$$L_{c \notin S_n} = \sum_j \left\{ \begin{array}{l} e^{-h_j} \sum\limits_{c \notin S_n}\sum\limits_{i} D_i^c \cdot \delta(z_i^c = +1) \cdot \delta(x_i \in X_j) + \\ e^{h_j} \sum\limits_{c \notin S_n}\sum\limits_{i} D_i^c \cdot \delta(z_i^c = -1) \cdot \delta(x_i \in X_j) \end{array} \right\}$$

$$L_c = \begin{cases} 2 \cdot \sum\limits_j \sqrt{\dfrac{\sum\limits_{i} D_i^c \cdot \delta(z_i^c = +1) \cdot \delta(x_i \in X_j) \cdot}{\sum\limits_{i} D_i^c \cdot \delta(z_i^c = -1) \cdot \delta(x_i \in X_j)}}, & \text{if } c \in S_n \\ \sum\limits_j \left\{ \begin{array}{l} e^{-h_j} \sum\limits_{i} D_i^c \cdot \delta(z_i^c = +1) \cdot \delta(x_i \in X_j) + \\ e^{h_j} \sum\limits_{i} D_i^c \cdot \delta(z_i^c = -1) \cdot \delta(x_i \in X_j) \end{array} \right\}, & \text{if } c \notin S_n \end{cases} \quad (5)$$

On the other hand, in a case where the output value $h_j^c$ is obtained from the expression 3, the optimization index value L may be calculated by using the following expression 6 or the expression 7. Strictly speaking, the optimization index values L (losses) calculated from the above expression 6 and the expression 7 are different.

$$L = L_{c \in S_n} + L_{c \notin S_n} \quad (6)$$

$$L_{c \in S_n} = \sum_{c \in S_n} \sum_j \left\{ (1-h_j)^2 \sum_i D_i^c \cdot \delta(z_i^c = +1) \cdot \delta(x_i \in X_j) + \right.$$

$$\left. (1+h_j)^2 \sum_i D_i^c \cdot \delta(z_i^c = -1) \cdot \delta(x_i \in X_j) \right\}$$

$$L_{c \notin S_n} = \sum_{c \in S_n} \sum_i D_i^c \{z_i^c - h_j\}$$

$$L_{c \in S_n} = \sum_j \left[ \{1-(h_j^c)^2\} \sum_{c \in S_n} \sum_i D_i^c \cdot \delta(x_i \in X_j) \right] \quad (7)$$

The shared class weak classifier selection unit 115 searches "the feature quantity and the combination $S_n$ of the positive class" where the optimization index value L derived by the optimization index calculation unit 114 becomes the least. The shared class weak classifier selection unit 115 employs the corresponding "reference table" in this case as a weak classifier. The shared class weak classifier selection unit 115 stores it as a weak classifier parameter in the classification dictionary storage unit 122.

The weight updating unit 116 updates each value of the weight table (see FIG. 3) by using the following expression 8. In the expression 8, the output value $h_j$ of the weak classifier is used.

$$D_i^c \leftarrow D_i^c e^{-z_i^c h_j^c} \quad (8)$$

The priority degree re-setting unit 117 automatically re-sets the priority degree of the classification of the entire positive classes and the negative class by using a predetermined expression. For example, in a case where the weight $D^{Neg}$ of the negative class>the weight $D^{Pos}$ of the positive class are set, the initial value may be calculated with $D^{Neg} > D^{Pos}$, and a new weight $D^{Pos}$ may be calculated with "original weight D×C". It should be noted that C is a constant for gradually increasing the weight, and, for example, this is set as C=1.1. In order to prevent reversing the magnitude relationship of the weight, the upper limit is set so as to satisfy $D^{Neg} \geq D^{Pos}$.

The purpose of re-setting the priority degree is that the weight of the negative sample is preferably set as follows: in the first stage of the learning processing, the weight of the negative sample is set to be heavy; Accordingly, the classification of the negative class and the positive class is treated with a higher importance; Then, gradually, the classification between the positive classes is treated with a higher importance. When the priority degree is set as described above, the weak classifier roughly distinguishes between an object and a non-object in the initial stage. After the determination, the weak classifier can precisely make determination for each positive class.

The learning end determination unit 118 determines whether the learning processing is to be terminated or not. In this termination determination, in a case of exceeding a predetermined number of times of learning, the learning processing may be determined to be terminated. Alternatively, the learning processing may be determined to be terminated in a case where, in the learning processing repeatedly performed, the amount of decrease in the difference of the optimization index value L between the current learning processing and the previous learning processing is less than a predetermined threshold value. For example, it is assumed that, in a case where the decrease threshold value of the relative value is 0.2, the optimization index value $L_1$ of the learning processing in any given time is 0.8, the optimization index value $L_2$ of the subsequent learning processing is 0.4, and the optimization index value $L_3$ of the subsequent learning processing is 0.3. In this case, $L_1-L_2=0.4$ is equal to or more than a threshold value, but $L_2-L_3=0.1$ is equal to or less than a threshold value. In this case, the learning end determination unit 118 determines to terminate the learning processing after calculating the optimization index value $L_3$. Alternatively, another evaluation data set may be prepared, and the termination may be determined in accordance with an classification error rate or an optimization index value obtained by actually identifying them.

(Operation of Classification Dictionary Learning System)

Figure 7:
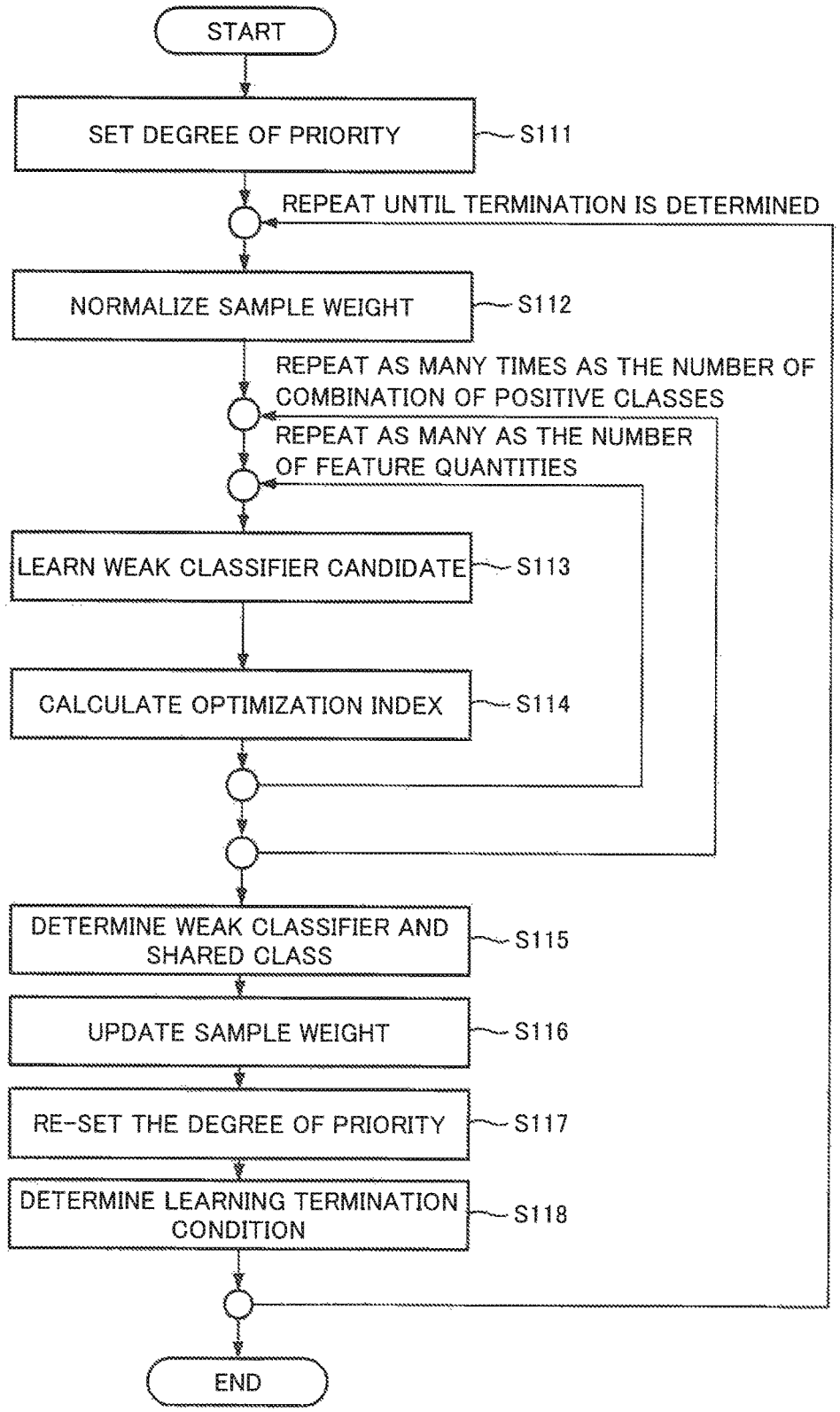
FIG. 7 is a flow diagram illustrating an operation of a classification dictionary learning system.

Subsequently, an operation of the classification dictionary learning system 100 will be explained with reference to a flow diagram of FIG. 7. In the following explanation, the number of positive classes will be denoted as $N_c$, and the number of feature quantities will be denoted as $N_f$.

(a) In step S111, the priority degree setting unit 111 sets the priority degree of the classification between the negative class and the positive class to a value designated by the user. The priority degree setting unit 111 obtains the value of the priority degree selected or input. On the basis of this priority degree, the priority degree setting unit 111 sets the weight value of the weight table as illustrated in FIG. 3, for example.

(b) In step S112, the weight normalization unit 112 normalizes the weight of a learning sample in accordance with the value of label z. The value of label z is stored in the label storage unit 123. In this processing, normalization is performed so that the summation of the sample weights to which label z=+1 is given becomes equal to the total summation of the weights of the samples to which label z=−1 is given. For example, the normalized weight table is as shown in FIG. 5.

(c) Subsequently, in step S113, the weak classifier candidate learning unit 113 performs learning processing of a weak classifier candidate for a combination $S_n$ of any given feature quantity and any given positive class. For example, the weak classifier candidate learning unit 113 generates the reference table for each of the candidates of the weak classifiers on the basis of the expression 2 or the expression 3.

(d) In step S114, the optimization index calculation unit 114 calculates the optimization index values L of multiple weak classifier candidates learned in step S113.

The processing in step S113 to step S114 explained above is repeatedly performed as many as the number $N_f$ of the feature quantities. Further, it is repeatedly performed as many times as the number of combinations $S_n$ of the positive classes. As a result of this repeated processing, the optimization index value L of the weak classifier candidate corresponding to each of the combinations $S_n$ of any given feature quantity and any given positive class are calculated. In the implementation, the feature quantity and the amount of the combination $S_n$ may be limited so that the repeated processing is finished within a practical processing time.

(e) In step S115, the shared class weak classifier selection unit 115 searches a combination of a feature quantity and a positive class yielding the minimum optimization index value L derived in the processing of step S114 from among the weak classifier candidates. The shared class weak classifier selection unit 115 employs the weak classifier corresponding to the searched combination. In other words, the weak classifier (and the feature quantity) may be interpreted as being shared between classes which belongs to the combination $S_n$ of the positive classes.

The shared class weak classifier selection unit 115 stores a parameter of a weak classifier employed (more specifically, information for identifying a feature quantity of a learning sample, a reference table for obtaining an output value of a weak classifier, and a combination of positive classes corresponding to a weak classifier) to the classification dictionary storage unit 122.

In step S115, the search may not be repeated for all of the elements of the class combination set $S_n$. Instead, the searched pattern in the elements of the class combination set $S_n$ may be reduced in accordance with the optimization index calculated in step S114. For example, a positive class of which optimization index value L is the minimum may be found. Then, only a class combination set $S_n$ including the positive class may be searched in the search processing. Alternatively, processing for searching upon adding another positive class, one by one, to the positive class of which optimization index value L is the minimum may be repeated. In this case, the number of times of repetitions is substantially proportional to the number of positive classes. Therefore, an approximate result can be obtained with a less number of times.

(f) In step S116, the weight updating unit 116 updates each value of the weight table of FIG. 5 by using expression 8.

(g) In step S117, the priority degree re-setting unit 117 automatically re-sets the priority degree of the classification of the negative class and the positive class by using a predetermined expression.

(h) Finally, in step S118, the learning end determination unit 118 determines termination of the learning processing. For example, the learning end determination unit 118 determines to terminate the learning processing in a case where a predetermined number of times of learning is exceeded, or in a case where the amount of decrease in the relative value of the optimization index value L between the previous learning processing and the current learning processing is less than a predetermined threshold value. On the other hand, in a case where the learning end determination unit 118 determines not to terminate the learning processing, step S111 is performed again in the series of processing explained above. In a case where the learning end determination unit 118 determines to terminate the processing, this learning processing is completed. As a result, the classification dictionary storage unit 122 recorded with all the parameters of the weak classifiers obtained during operation of the classification dictionary learning system 100 is completed.

Figure 8:
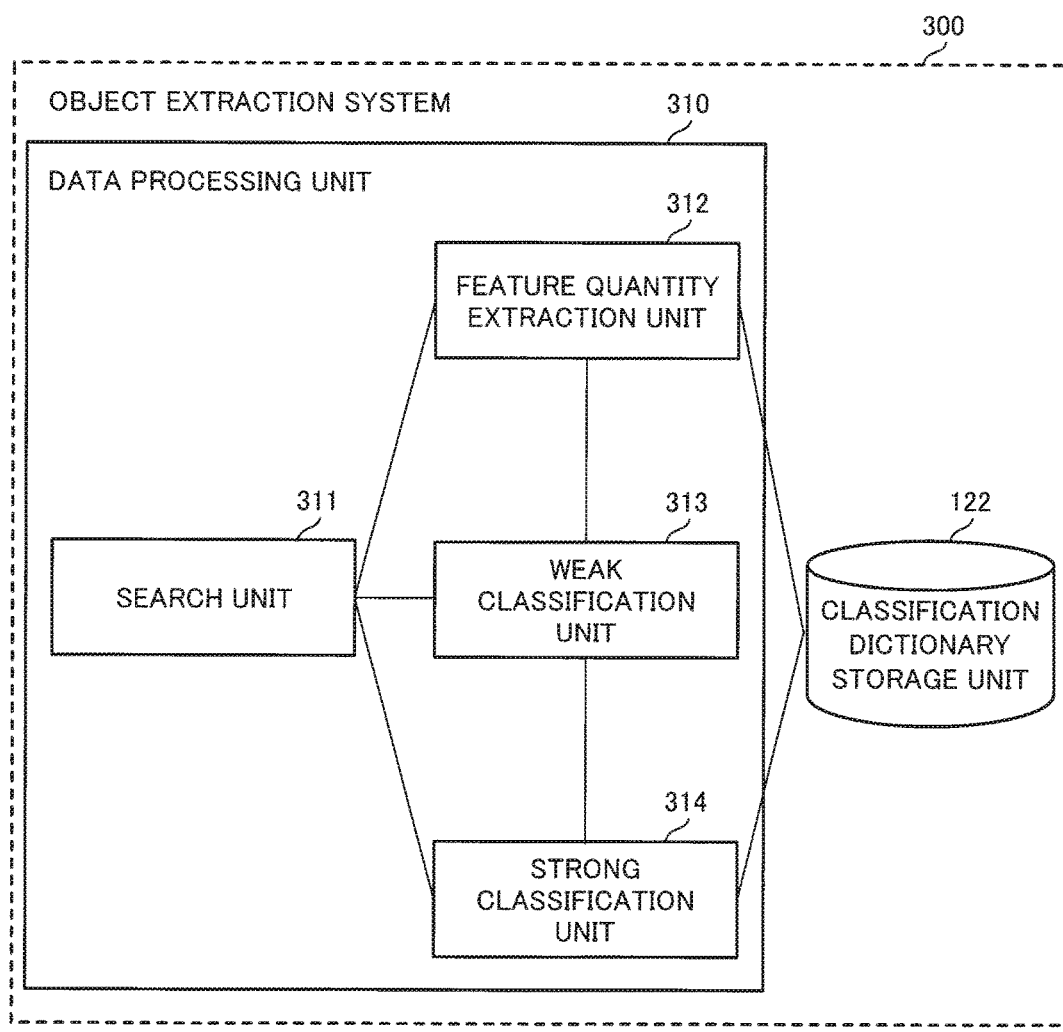
FIG. 8 is a system diagram illustrating an example of usage of a classification dictionary storage unit generated by a classification dictionary learning system.

Subsequently, an example of usage of the classification dictionary storage unit 122 generated as a result of the learning explained above will be explained with reference to FIG. 8. The classification dictionary storage unit 122 generated in the series of learning process according to the present exemplary embodiment is used in the object detection system 300 performing the processing for actually detecting the object. The object detection system 300 includes a data processing unit 310 and a classification dictionary storage unit 122. The data processing unit 310 includes a search unit 311, a feature quantity extraction unit 312, a weak classification unit 313, and a strong classification unit 314.

The search unit 311 uses a search window to scan the image in question in order to search an object in the image in question. As a result of scanning using the search window, the search unit 311 may determine that an object to be searched exists in the search window from which a result that appears to be most positive is obtained. Then, the search unit 311 may adopt the determination as a detection result. The feature quantity extraction unit 312 extracts the same feature quantity, for example, a pixel value, as the feature quantity stored in the classification dictionary storage unit 122 within the search window being scanned. The weak classification unit 313 derives an output value by using an expression of the weak classification on the basis of the extracted feature quantity. The strong classification unit 314 derives the total summation of the output values of the weak classifiers on the basis of the reference expression in the classification dictionary storage unit 122, and outputs this as a result of the strong classification.

According to the classification dictionary learning system 100 of the first exemplary embodiment of the present invention, when generating the classification dictionary for detecting a particular object of which change in the appearance is large in the image in question, a user freely sets the priority degree between classes to be classified, so that a classification dictionary from which a high classification rate can be obtained can be generated. The reason for this is as follows. When the classification dictionary learning system 100 generates a classification dictionary, a weak classifier is set so that the classification accuracy between the positive class and the negative class is treated with a higher importance in the learning initial state, so that the weak classifier can be learned in accordance with the setting condition. Further, as the learning advances, the weak classifier is automatically set so that the classification accuracy between the positive classes is treated with a higher importance. Therefore, the weak classifier can be learned while the classification accuracy between the positive classes is raised.

Second Exemplary Embodiment

Figure 9:
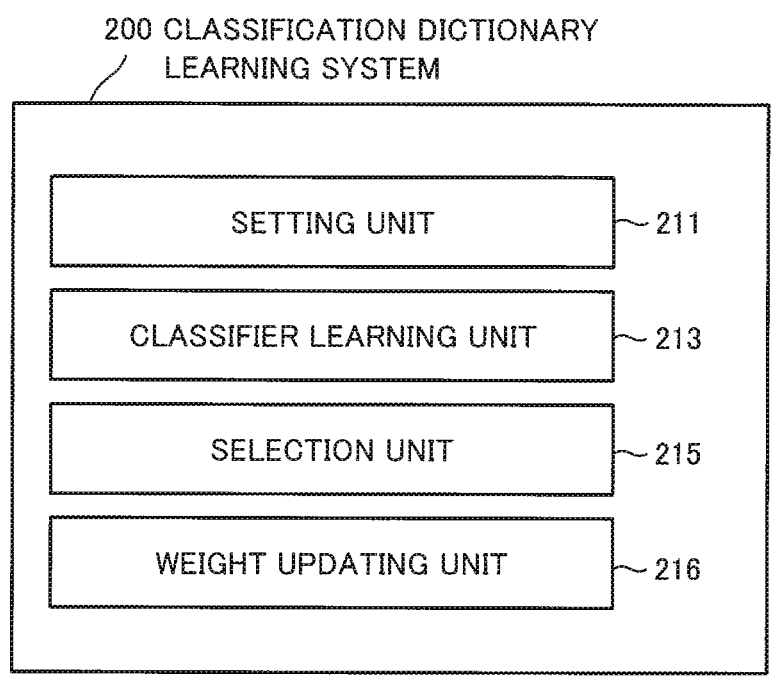
FIG. 9 is a figure illustrating an internal configuration of a classification dictionary learning system according to a second exemplary embodiment of the present invention.

As illustrated in FIG. 9, the classification dictionary learning system 200 according to the second exemplary embodiment includes a setting unit 211, an identifier learning unit 213, a selection unit 215, and a weight updating unit 216.

The setting unit 211 sets the priority degree of the classification between the first class and the second class including the sub-class to a value designated by the user and the like. The identifier learning unit 213 sets the priority degree. The selection unit 215 learns multiple identifiers on the basis of the priority degree for each combination of sub-classes. The weight updating unit 216 updates the weight on the basis of the classification accuracy based on the identifier learned with the selected combination.

According to the classification dictionary learning system 200 of the second exemplary embodiment of the present invention, when a classification dictionary is generated, the user sets the priority degree of the classification between the first class and the second class including the sub-class. Therefore, according to the present exemplary embodiment, even in a case where a particular object of which variation in its appearance is large is detected in the image in question, a classification dictionary having a high classification force can be generated.

A method performed by a transportation expense application server 20 according to the present invention may be applied to a program which is to be executed by a computer. The program can be stored to a storage medium, and can be provided to the outside via a network.

(Information Processing Apparatus)

The classification dictionary learning systems 100, 200 according to the above exemplary embodiment can also be realized by using an information processing apparatus (computer). In this case, each of the following configurations of each unit of the classification dictionary learning systems 100, 200 can be understood as a function (processing) unit (software module) of the software program.

Each unit in the data processing unit 110 (the priority degree setting unit 111, the weight normalization unit 112, the weak classifier candidate learning unit 113, the optimization index calculation unit 114, the shared class weak classifier selection unit 115, the weight updating unit 116, and the priority degree re-setting unit 117) in FIG. 2, and, the setting unit 211, the identifier learning unit 213, the selection unit 215, and the weight updating unit 216 as illustrated in FIG. 9.

An example of a hardware environment capable of achieving these functions (processing) will be explained with reference to FIG. 10. The division of each unit illustrated in these drawings is a configuration for the sake of explanation, and various configurations can be considered for the implementation.

FIG. 10 is a figure for explaining, as an example, a configuration of an information processing apparatus 1000 capable of executing the classification dictionary learning systems 100, 200 according to the exemplary embodiment of the present invention.

The information processing apparatus 1000 as illustrated in FIG. 10 is a generally-available computer in which the following configurations are connected via a bus (communication line) 3008.

CPU 3001,

ROM (Read Only Memory) 3002,

RAM (Random Access Memory) 3003,

Storage apparatus 3004 (including the weight storage unit 121, the classification dictionary storage unit 122, and the label storage unit 123 as illustrated in FIG. 2), Input and output user interface (Interface: hereinafter referred to as "I/F") 3005, Communication with external apparatus I/F 3006, Drive apparatus 3009.

The drive apparatus 3009 reads software (program) for executing the information processing apparatus 1000 from the recording medium 3010.

Then, in the above hardware environment, the above exemplary embodiment is achieved according to the following procedure. More specifically, a computer program capable of achieving the functions of the block configuration diagram referred to in the explanation of the exemplary embodiment (the data processing unit 110 of FIG. 2 and each unit of FIG. 9 as described above) or a flowchart (FIG. 7) is provided from the network 3000 or the drive apparatus 3009 to the information processing apparatus 1000 as illustrated in FIG. 10. Therefore, a computer program is read by the CPU 3001 of the hardware to be interpreted, and executed by the CPU 3001. The computer program provided to the apparatus 1000 may be stored to a readable and writable volatile storage device (RAM 3003) or a nonvolatile storage device such as the storage apparatus 3004.

Some or all of the exemplary embodiments may be described as shown in the following Supplementary Notes, but are not limited thereto.

[Supplementary Note 1]

An classification dictionary learning system comprising:

a setting unit that receives a priority degree of a classification including a first class and a second class including a sub-class, and sets the priority degree;

an identifier learning unit that learns a plurality of identifiers on the basis of the priority degree for each combination of the sub-classes;

a selection unit that selects a combination of the sub-classes in which a predetermined optimization index is the most preferable with regard to the identifier; and a weight update unit that updates a weight on the basis of an classification accuracy based on the identifier learned with the selected combination.

[Supplementary Note 2]

The classification dictionary learning system according to Supplementary Note 1, wherein the first class includes a negative class and a positive class, and the setting unit gives a prompt to set, to a higher level, a priority degree of a classification between a negative class and a positive class.

[Supplementary Note 3]

The classification dictionary learning system according to Supplementary Note 1 or 2, wherein in a case where the first class is a positive class, the second class includes a plurality of positive classes, and the classification dictionary learning system further comprises a re-setting r for re-setting the priority degree so that the priority degree of the classification between the plurality of positive classes gradually increases.

[Supplementary Note 4]

The classification dictionary learning system according to any one of Supplementary Notes 1 to 3, wherein the identifier learning unit includes a plurality of weak classifiers, an output of the weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of learning samples including positive classes and negative classes except the positive class where the value of the feature quantity is within a predetermined range and further deriving a total summation over an entire class in which the weak classifier is share.

[Supplementary Note 5]

The classification dictionary learning system according to any one of Supplementary Notes 1 to 4, further comprising an optimization index calculation unit for calculating the optimization index of the weak classifier, wherein the optimization index is calculated on the basis of a product of the first value and the second value.

[Supplementary Note 6]

An classification dictionary learning method used for a classification dictionary learning system for generating a classification dictionary, comprising:

receiving a priority degree of a classification including a first class and a second class including a sub-class, and setting the priority degree;

learning a plurality of identifiers on the basis of the priority degree for each combination of the sub-classes;

selecting a combination of the sub-classes in which a predetermined optimization index is the most preferable with regard to the identifier; and updating a weight on the basis of an classification accuracy based on the identifier learned with the selected combination.

[Supplementary Note 7]

The classification dictionary learning method according to Supplementary Note 6, wherein the first class includes a negative class and a positive class, and during the setting, a prompt is given to set, to a higher level, a priority degree of a classification between a negative class and a positive class.

[Supplementary Note 8]

The classification dictionary learning method according to Supplementary Note 6 or 7, wherein in a case where the first class is a positive class, the second class includes a plurality of positive classes, the priority degree is re-set so that the priority degree of the classification between the plurality of positive classes gradually increases.

[Supplementary Note 9]

The classification dictionary learning method according to any one of Supplementary Notes 6 to 8, wherein the identifier learning unit includes a plurality of weak classifiers, an output of the weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of learning samples including positive classes and negative classes except the positive class where the value of the feature quantity is within a predetermined range and further deriving a total summation over an entire class in which the weak classifier is share.

[Supplementary Note 10]

The classification dictionary learning method according to any one of Supplementary Notes 6 to 9, further comprising an optimization index calculation unit for calculating the optimization index of the weak classifier, wherein the optimization index is calculated on the basis of a product of the first value and the second value.

[Supplementary Note 11]

An classification dictionary learning program used for a classification dictionary learning system for generating a classification dictionary, comprising:

receiving a priority degree of a classification including a first class and a second class including a sub-class, and setting the priority degree;

learning a plurality of identifiers on the basis of the priority degree for each combination of the sub-classes;

selecting a combination of the sub-classes in which a predetermined optimization index is the most preferable with regard to the identifier; and updating a weight on the basis of an classification accuracy based on the identifier learned with the selected combination.

[Supplementary Note 12]

The classification dictionary learning program for executing the computer, according to Supplementary Note 11, wherein the first class includes a negative class and a positive class, and during the setting, a prompt is given to set, to a higher level, a priority degree of a classification between a negative class and a positive class.

[Supplementary Note 13]

The classification dictionary learning program according to Supplementary Note 11 or 12, wherein in a case where the first class is a positive class, the second class includes a plurality of positive classes, the priority degree is re-set so that the priority degree of the classification between the plurality of positive classes gradually increases.

[Supplementary Note 14]

The classification dictionary learning program for executing the computer, according to any one of Supplementary Notes 11 to 13, wherein the identifier learning unit includes a plurality of weak classifiers, an output of the weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of learning samples including positive classes and negative classes except the positive class where the value of the feature quantity is within a predetermined range and further deriving a total summation over an entire class in which the weak classifier is share.

[Supplementary Note 15]

The classification dictionary learning system according to any one of Supplementary Notes 11 to 14, further comprising an optimization index calculation unit for calculating the optimization index of the weak classifier, wherein the optimization index is calculated on the basis of a product of the first value and the second value.

The present invention has been hereinabove explained while the exemplary embodiment is adopted as a model example. However, the present invention is not limited to the above exemplary embodiment. More specifically, various aspects that can be understood by a person skilled in the art can be applied to the present invention within the scope of the present invention.

This application claims the priority based on Japanese Patent Application No. 2014-067597 filed on Mar. 28, 2014, and the entire contents thereof are incorporated herein by reference.

REFERENCE SIGNS LIST

100, 200 classification dictionary learning system
110 data processing unit
111 priority degree setting unit
112 weight normalization unit
113 weak classifier candidate learning unit
114 optimization index calculation unit
115 shared class weak classifier selection unit
116 weight updating unit
117 priority degree re-setting unit
118 learning end determination unit
121 weight storage unit
122 classification dictionary storage unit
123 label storage unit
300 object detection system
310 data processing unit
311 search unit
312 feature quantity extraction unit
313 weak classification unit
314 strong classification unit

The invention claimed is:

1. A classification dictionary learning system comprising:
a memory storing instructions; and
at least one processor configured to process the instructions to:
receive a priority degree of a classification between a first class and a second class, the second class including one or more sub-classes;
based on the value that corresponds to the priority degree, set a weight value of a weight table in which a weight coefficient of each of a plurality of learning samples is described for each of the sub-classes;
learn a plurality of classifiers on the basis of the priority degree for each combination of the sub-classes;
select a combination of the sub-classes in which a specific optimization index is the most preferable with regard to each of the classifiers; and
update a weight on the basis of a classification accuracy based on a classifier learned with the selected combination for setting the priority degree of the classification between the first class and the second class to a classification among the subclasses included in the second class.

2. The classification dictionary learning system according to claim 1, wherein
the first class includes a negative class and one or more positive classes, and
in the setting, a priority degree of a classification between a negative class and the positive classes is set to become higher than other classifications.

3. The classification dictionary learning system according to claim 1, wherein
in a case where the first class is one of positive classes, the second class includes other positive classes, and
the at least one processor is further configured to: re-set the priority degree so that the priority degree of the classification between the other positive classes gradually increases.

4. The classification dictionary learning system according to claim 2, wherein in a case where the first class is a positive class, the second class includes a plurality of positive classes, and the at least one processor is further configured to: re-set the priority degree so that the priority degree of the classification between the plurality of positive classes gradually increases.

5. The classification dictionary learning system according to claim 1, wherein
the learning the plurality of classifiers includes learning a plurality of weak classifiers, and
an output of a weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of the learning samples including positive classes and negative classes except the positive class where the value of the feature quantity is within the predetermined range and further deriving a total summation over the entire class in which the weak classifier is shared.

6. The classification dictionary learning system according to claim 2, wherein
the learning the plurality of classifiers includes learning a plurality of weak classifiers, and
an output of a weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of the learning samples including positive classes and negative classes except the positive class where the value of the feature quantity is within the predetermined range and further deriving a total summation over the entire class in which the weak classifier is shared.

7. The classification dictionary learning system according to claim 3, wherein
the learning the plurality of classifiers includes learning a plurality of weak classifiers, and
an output of a weak classifier is calculated on the basis of a rate of a first value obtained by deriving a total summation of weights of learning samples of a single positive class where values of feature quantities of the learning samples are within a predetermined range and further deriving a total summation over an entire class in which the weak classifier is shared, and a second value obtained by deriving a total summation of weights of the learning samples including positive classes and negative classes except the positive class where the value of the feature quantity is within the predetermined range and further deriving a total summation over the entire class in which the weak classifier is shared.

8. The classification dictionary learning system according to claim 5, wherein
the at least one processor is further configured to: calculate the optimization index of the weak classifier, and
the optimization index is calculated on the basis of a product of the first value and the second value.

9. The classification dictionary learning system according to claim 6, wherein
the at least one processor is further configured to: calculate the optimization index of the weak classifier, and
the optimization index is calculated on the basis of a product of the first value and the second value.

10. The classification dictionary learning system according to claim 7, wherein
the at least one processor is further configured to: calculate the optimization index of the weak classifier, and
the optimization index is calculated on the basis of a product of the first value and the second value.

11. The classification dictionary learning system according to claim 4, wherein
the at least one processor is further configured to: calculate the optimization index of a weak classifier that is learned, and
the optimization index is calculated on the basis of a product of a first value and a second value.

12. A classification dictionary learning method used for a classification dictionary learning system for generating a classification dictionary, the classification dictionary learning method comprising:
receiving a priority degree of a classification between a first class and a second class, the second class including one or more sub-classes;
based on the value that corresponds to the priority degree, setting a weight value of a weight table in which a weight coefficient of each of a plurality of learning samples is described for each of the sub-classes; the priority degree;

learning a plurality of classifiers on the basis of the priority degree for each combination of the sub-classes;

selecting a combination of the sub-classes in which a specific optimization index is the most preferable with regard to each of the classifiers; and updating a weight on the basis of a classification accuracy based on the classifier learned with the selected combination for setting the priority degree of the classification between the first class and the second class to a classification among the subclasses included in the second class.

13. The classification dictionary learning method according to claim 12, wherein
the first class includes a negative class and one or more positive classes, and
during the setting, a prompt is given to set, to a higher level, a priority degree of a classification between a negative class and the positive classes is set to become higher than other classifications.

14. The classification dictionary learning method according to claim 12, wherein in a case where the first class is one of positive classes, the second class includes other positive classes, and the priority degree is re-set so that the priority degree of the classification between the other positive classes gradually increases.

15. The classification dictionary learning method according to claim 13, wherein in a case where the first class is one of the positive classes, the second class includes other positive classes, and the priority degree is re-set so that the priority degree of the classification between the other positive classes gradually increases.

16. A non-transitory computer-readable recording medium storing a classification dictionary learning program used for a classification dictionary learning system for generating a classification dictionary, wherein the classification dictionary learning program causes a computer to perform functions that include:
receiving a priority degree of a classification between a first class and a second class, the second class including one or more sub-classes;

based on the value that corresponds to the priority degree, setting a weight value of a weight table in which a weight coefficient of each of a plurality of learning samples is described for each of the sub-classes;

learning a plurality of classifiers on the basis of the priority degree for each combination of the sub-class;

selecting a combination of the sub-classes in which a specific optimization index is the most preferable with regard to each of the classifiers; and updating a weight on the basis of a classification accuracy based on a classifier learned with the selected combination for setting the priority degree of the classification between the first class and the second class to a classification among the subclasses included in the second class.

17. The recording medium according to claim 16, wherein
the first class includes a negative class and one or more positive classes, and
the recording medium further causes the computer to, in the setting, a priority degree of a classification between a negative class and the positive classes is set to become higher than other classifications.

18. The classification dictionary learning system according to claim 1, wherein the at least one processor is further configured to:
normalize a weight of a learning sample in accordance with the weight value;
generate a reference table for each of a plurality of weak classifier candidates by performing a learning process of the weak classifier candidate for a combination of any given feature quantity and any given first class;
select a combination of the sub-classes in which a specific optimization index is the most preferable with regard to each of the weak classifiers;
update a weight of each class that is the target for the priority degree setting on the basis of a classification accuracy based on a classifier learned with the selected combination of the sub-classes for setting the priority degree of the classification between the first class and the second class to classification among the subclasses included in the second class; and
perform image recognition based on the updated weight of each class.

* * * * *